(12) United States Patent
Chen et al.

(10) Patent No.: US 11,394,816 B2
(45) Date of Patent: Jul. 19, 2022

(54) FLEXIBLE ORGANIC LIGHT-EMITTING DIODE MOBILE PHONE MODULE

(71) Applicant: WUHAN CHINA STAR OPTOELECTRONICS SEMICONDUCTOR DISPLAY TECHNOLOGY CO., LTD., Wuhan (CN)

(72) Inventors: Bao Chen, Wuhan (CN); Yapeng Cheng, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 587 days.

(21) Appl. No.: 16/343,965

(22) PCT Filed: Dec. 12, 2018

(86) PCT No.: PCT/CN2018/120481
§ 371 (c)(1),
(2) Date: Apr. 22, 2019

(87) PCT Pub. No.: WO2020/113633
PCT Pub. Date: Jun. 11, 2020

(65) Prior Publication Data
US 2021/0360098 A1 Nov. 18, 2021

(30) Foreign Application Priority Data

Dec. 3, 2018 (CN) .......................... 201811476416.5

(51) Int. Cl.
*H04M 1/02* (2006.01)

(52) U.S. Cl.
CPC ................................ *H04M 1/0268* (2013.01)

(58) Field of Classification Search
CPC .................................................... H04M 1/0268
See application file for complete search history.

(56) References Cited

U.S. PATENT DOCUMENTS

| 2004/0052044 | A1* | 3/2004 | Mochizuki | G06F 1/1616 361/679.09 |
|---|---|---|---|---|
| 2016/0323966 | A1* | 11/2016 | Hamel | H05B 33/26 |
| 2018/0160553 | A1* | 6/2018 | Yeh | G06F 1/1652 |
| 2018/0197933 | A1* | 7/2018 | Son | H01L 27/3248 |

* cited by examiner

*Primary Examiner* — Hsinchun Liao
(74) *Attorney, Agent, or Firm* — Kirton McConkie; Evan R. Witt

(57) ABSTRACT

A flexible organic light-emitting diode (OLED) mobile phone module of the present disclosure is provided, including a mid-frame, a flexible OLED panel attached to the mid-frame, a back cover connected to the mid-frame, and a buffer layer disposed between the mid-frame and the back cover. The buffer layer is configured to absorb an impact force exerted on the flexible OLED panel. When the flexible OLED panel is impacted by a steel ball or the like, the impact force can be transmitted to the buffer layer through the mid-frame, and the buffer layer can absorb most of energy, so that no sharp impact occurs between the mid-frame and the back cover, thereby protecting the flexible OLED panel and improving impact resistance of the flexible OLED mobile phone module.

8 Claims, 5 Drawing Sheets

FLEXIBLE ORGANIC LIGHT-EMITTING DIODE MOBILE PHONE MODULE

FIELD OF DISCLOSURE

The present disclosure relates to the field of display technologies, and in particular, to a flexible organic light-emitting diode (OLED) mobile phone module.

BACKGROUND

Thin film transistors (TFTs) are main driving components in liquid crystal displays (LCDs) and active matrix organic light-emitting diodes (AMOLEDs), which directly relate to display performance of flat panel display devices.

Most of the liquid crystal displays on the market are backlit liquid crystal displays, which include a liquid crystal display panel and a backlight module. Operating principle of the liquid crystal display panel is that liquid crystal molecules are filled between a thin film transistor array substrate (TFT array substrate) and a color filter (CF) substrate, and a pixel voltage and a common voltage are respectively applied to the two substrates, and a rotation direction of the liquid crystal molecules is controlled by an electric field formed between the pixel voltage and the common voltage, so as to transmit light from the backlight module to generate images.

An organic light-emitting diode (OLED) device generally includes a substrate, an anode disposed on the substrate, a hole injection layer disposed on the anode, a hole transport layer disposed on the hole injection layer, and a light-emitting layer disposed on the hole transport layer, an electron transport layer disposed on the light-emitting layer, an electron injection layer disposed on the electron transport layer, and a cathode disposed on the electron injection layer. Luminescing principle of the OLED device is that semiconductor materials and organic luminescent materials are driven by electric fields, thereby causing luminescence by carrier injection and recombination. Specifically, the OLED device generally uses an indium tin oxide (ITO) electrode and a metal electrode as the anode and the cathode of the device, respectively. Under a certain voltage, electrons and holes are injected from the cathode and the anode to the electron transport layer and the hole transport layer, respectively. The electrons and holes migrate to the light-emitting layer through the electron transport layer and the hole transport layer, respectively, and meet in the light-emitting layer to form excitons and excite light-emitting molecules, and the light-emitting molecules emits visible light through radiation relaxation.

In recent years, OLED display technology is gradually popularizing in mobile phones and TV market, and a yield rate has been greatly improved. Its status as a next-generation display technology is unassailable, and OLED-based flexible display technology is an important research and development of future display technology. A flexible OLED screen is different from a LCD liquid crystal screen and a rigid OLED screen. In order to achieve bending, the flexible OLED screen cannot use a thick cover glass for an outer surface impacted by a falling ball, but should use a thin flexible cover plate, so that the flexible OLED screen has poor falling ball impact resistance.

SUMMARY OF DISCLOSURE

An object of the present disclosure is to provide a flexible organic light-emitting diode (OLED) mobile phone module with high impact resistance.

In order to achieve the above object, the present disclosure provides a flexible OLED mobile phone module, a mid-frame, a flexible OLED panel attached to the mid-frame, a back cover connected to the mid-frame, and a buffer layer disposed between the mid-frame and the back cover;

the buffer layer is configured to absorb an impact force exerted on the flexible OLED panel.

The flexible OLED panel comprises a bending area, a first non-bending area adjacent to one side of the bending area, and a second non-bending area adjacent to another side of the bending area;

the mid-frame comprises a first mid-frame portion corresponding to the first non-bending area and a second mid-frame portion corresponding to the second non-bending area; and the first non-bending area is attached to the first mid-frame portion, and the second non-bending area is attached to the second mid-frame portion.

The back cover comprises a first back cover portion corresponding to the first non-bending area, a second back cover portion corresponding to the second non-bending area, a hinge corresponding to the bending area, a first sliding spring slidably connected to the first back cover portion, and a second sliding spring slidably connected to the second back cover portion, wherein the first sliding spring and the second sliding spring are fixedly connected by the hinge.

The first back cover portion is provided with a first protuberance corresponding to the first sliding spring, and the first sliding spring is provided with a first recess corresponding to the first protuberance;

the second back cover portion is provided with a second protuberance corresponding to the second sliding spring, and the second sliding spring is provided with a second recess corresponding to the second protuberance;

the first back cover portion and the first sliding spring are slidably connected by the first protuberance and the first recess; and the second back cover portion and second sliding spring are slidably connected by the second protuberance and the second recess.

The first back cover portion is connected to the first mid-frame portion by a screw, and the second back cover portion is connected to the second mid-frame portion by another screw.

The buffer layer comprises a rubber gasket.

The buffer layer comprises a first buffer portion disposed between the first back cover portion and the first mid-frame portion, and a second buffer portion disposed between the second back cover portion and the second mid-frame portion;

a shape of the first buffer portion comprises a "-" shape, and a shape of the second buffer portion comprises a "U" shape.

The first mid-frame portion is provided with a third recess configured to accommodate the first buffer portion, and the second mid-frame portion is provided with a fourth recess configured to accommodate the second buffer portion.

A depth of the third recess is less than a thickness of the first buffer portion, and a depth of the fourth recess is less than a thickness of the second buffer portion.

A cross-sectional shape of the buffer layer comprises a rectangular shape or a zigzag.

Advantages of the present disclosure are that the flexible OLED mobile phone module of the present disclosure includes: a mid-frame, a flexible OLED panel attached to the mid-frame, a back cover connected to the mid-frame, and a buffer layer disposed between the mid-frame and the back cover. The buffer layer is configured to absorb an impact force exerted on the flexible OLED panel. When the flexible OLED panel is impacted by a steel ball or the like, the impact force can be transmitted to the buffer layer through the mid-frame, and the buffer layer can absorb most of energy, so that no sharp impact occurs between the mid-frame and the back cover, thereby protecting the flexible OLED panel and improving impact resistance of the flexible OLED mobile phone module.

BRIEF DESCRIPTION OF DRAWINGS

For better understanding of the features and technical contents of the present disclosure, reference will be made to the following detailed description of the present disclosure and the attached drawings. However, the drawings are provided for purposes of reference and illustration and are not intended to impose limitations to the present disclosure.

In the drawings.

DETAILED DESCRIPTION

To further expound technical solutions adopted in the present disclosure and advantages thereof, a detailed description is given to preferred embodiments of the present disclosure with reference to the attached drawings.

Figure 1:
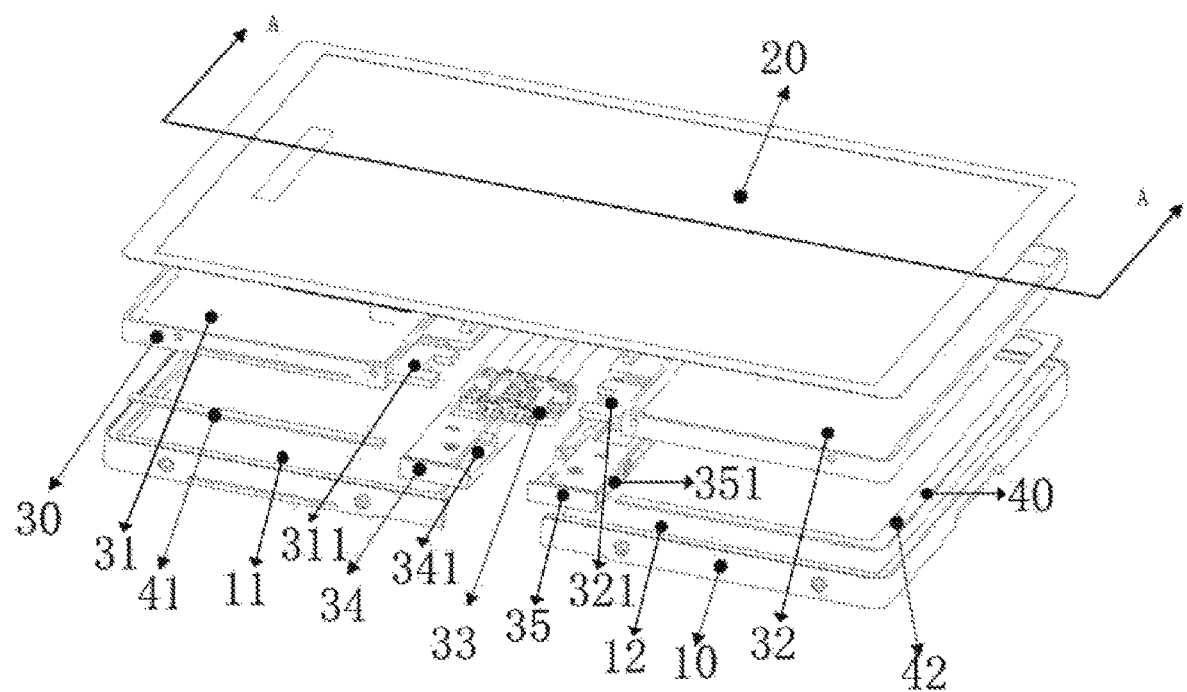
FIG. 1 is a schematic structural diagram of a flexible organic light-emitting diode (OLED) mobile phone module of the present disclosure.

Referring to FIG. 1, the present disclosure provides a flexible organic light-emitting diode (OLED) mobile phone module, including: a mid-frame 10, a flexible OLED panel 20 attached to the mid-frame 10, a back cover 30 connected to the mid-frame 10, and a buffer layer 40 disposed between the mid-frame 10 and the back cover 30.

The buffer layer 40 is configured to absorb an impact force exerted on the flexible OLED panel 20.

It should be noted that the present disclosure provides the buffer layer 40 disposed between the mid-frame 10 and the back cover 30. When the flexible OLED panel 20 is impacted by a steel ball or the like, the impact force can be transmitted to the buffer layer 40 through the mid-frame 10, and the buffer layer 40 can absorb most of energy, so that no sharp impact occurs between the mid-frame 10 and the back cover 30, thereby protecting the flexible OLED panel 20 and improving impact resistance of the flexible OLED mobile phone module.

Figure 2:
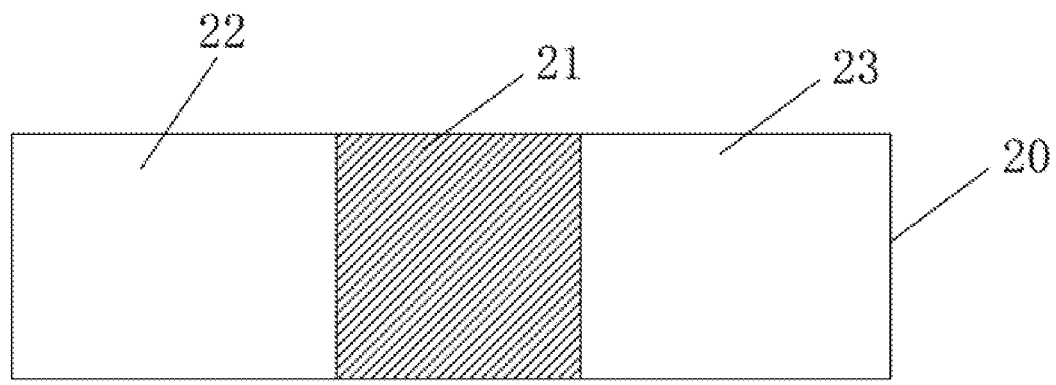
FIG. 2 is a schematic diagram of a flexible OLED panel of a flexible OLED mobile phone module of the present disclosure.

Specifically, referring to FIG. 2, the flexible OLED panel 20 includes a bending area 21, a first non-bending area 22 on a side of the bending area 21, and a second non-bending area 23 on another side of the bending area 21.

The mid-frame 10 includes a first mid-frame portion 11 corresponding to the first non-bending area 22 and a second mid-frame portion 12 corresponding to the second non-bending area 23, i.e., a portion of the mid-frame 10 corresponding to the bending area 21 is empty.

The first non-bending area 22 is attached to the first mid-frame portion 11, and the second non-bending area 23 is attached to the second mid-frame portion 12.

Figure 3:
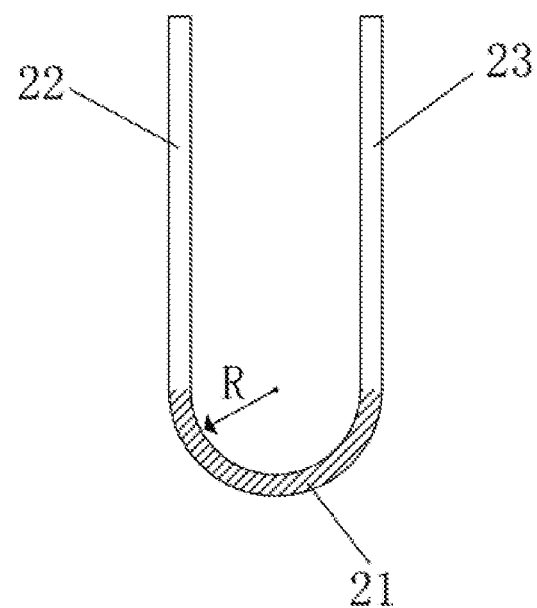
FIG. 3 is a schematic diagram showing bending of a flexible OLED panel of a flexible OLED mobile phone module of the present disclosure.

Specifically, referring to FIG. 3, assuming that a bending radius of the flexible OLED panel 20 is R, a length L0 of the bending area 21 is πR. When bending is performed at a center of the bending area 21, a length change amount ΔL of a flattened state and a bent state on both sides of the flexible OLED panel 20 is (πR/2)−R.

Specifically, the back cover 30 includes a first back cover portion 31 corresponding to the first non-bending area 22, a second back cover portion 32 corresponding to the second non-bending area 23, a hinge 33 corresponding to the bending area 21, a first sliding spring 34 slidably connected to the first back cover portion 31, and a second sliding spring 35 slidably connected to the second back cover portion 32. The first sliding spring 34 and the second sliding spring 35 are fixedly connected by the hinge 33. When the flexible OLED panel 20 is bent, the hinge 33 corresponding to the bending area 21 is bent, the first sliding spring 34 slides toward the first back cover portion 31, and the second sliding spring 35 slides toward the second back cover portion 32, so as to compensate for the length change amount (πR/2)−R of the flexible OLED panel 20 in the bent state and the flattened state, so that the bending area 21 is not subjected to a pulling force, and the flexible OLED mobile phone module is bent.

Figure 4:
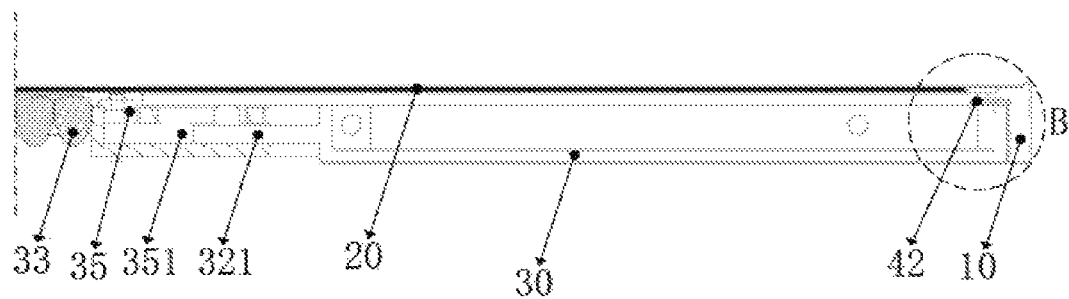
FIG. 4 is a cross-section view of a flexible OLED mobile phone module of the present disclosure along a line A-A.

Furthermore, referring to FIG. 4, the first back cover portion 31 is provided with a first protuberance 311 corresponding to the first sliding spring 34, and the first sliding spring 34 is provided with a first recess 341 corresponding to the first protuberance 311. The second back cover portion 32 is provided with a second protuberance 321 corresponding to the second sliding spring 35. The second sliding spring 35 is provided with a second recess 351 corresponding to the second protuberance 321. The first back cover portion 31 and the first sliding spring 34 are slidably connected by the first protuberance 311 and the first recess 341. The second back cover portion 32 and second sliding spring 35 are slidably connected by the second protuberance 321 and the second recess 351.

Specifically, the first back cover portion 31 is connected to the first mid-frame portion 11 by a screw. The second back cover portion 32 is connected to the second mid-frame portion 12 by another screw.

Specifically, the buffer layer 40 is a rubber gasket, and the rubber gasket can absorb most of energy because it exhibits superelastic deformation.

Figure 5:
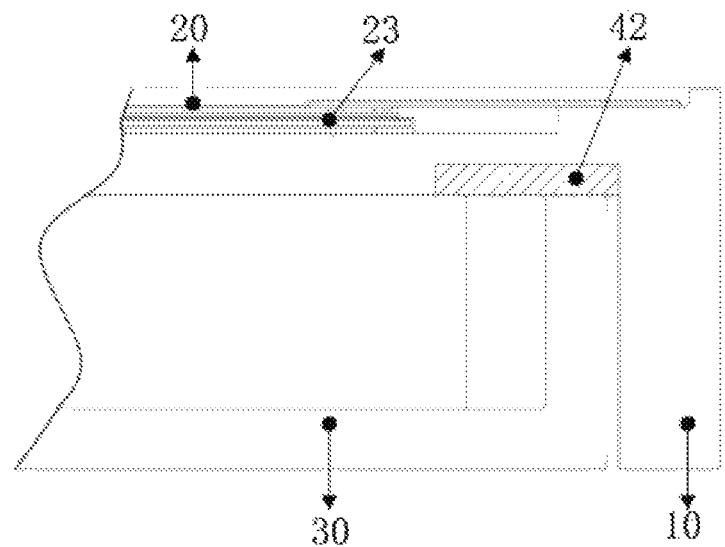
FIG. 5 is an enlarged schematic diagram of a portion B of FIG. 4.

Specifically, referring to FIG. 1 and FIG. 5, the buffer layer 40 includes a first buffer portion 41 disposed between the first back cover portion 31 and the first mid-frame portion 11 and a second buffer portion 42 disposed between the second back cover portion 32 and the second mid-frame portion 12. A shape of the first buffer portion 41 includes a "-" shape, and a shape of the second buffer portion 42 includes a "U" shape.

Since it is necessary to reserve a space for disposing, such as a flexible circuit board in the first mid-frame portion 11 of the mid-frame 10, a space in the first buffer portion 41 is insufficient, and the shape of the first buffer portion 41 can only be set to the "-" shape. A space reserved for the second buffer portion 42 in the second mid-frame portion 12 of the mid-frame 10 is sufficient, and the shape of the second buffer portion 42 can be set to the "U" shape.

Furthermore, the first mid-frame portion 11 is provided with a third recess configured to accommodate the first buffer portion 41, and the second mid-frame portion 12 is provided with a fourth recess configured to accommodate the second buffer portion 42. The first buffer portion 41 is placed in the third recess, and the second buffer portion 42 is placed in the fourth recess, thereby reducing a thickness of the flexible OLED mobile phone module.

Specifically, a depth of the third recess is less than a thickness of the first buffer portion 41, and a depth of the fourth recess is less than a thickness of the second buffer portion 42, so as to achieve better shock absorption.

Figure 6:
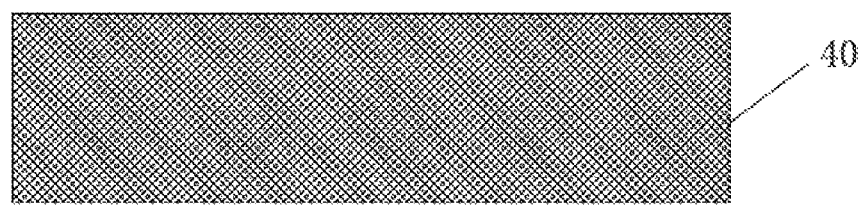
FIG. 6 and FIG. 7 are schematic structural diagrams of a buffer layer of a flexible OLED mobile phone module of the present disclosure.
Figure 7:
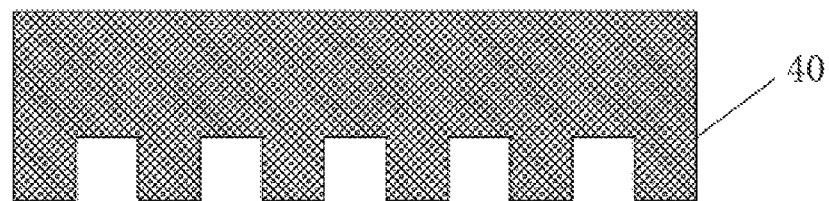

Specifically, referring to FIG. 6 and FIG. 7, a cross-sectional shape of the buffer layer 40 is a rectangular shape or a zigzag. The cross-sectional shape of the buffer layer 40 of the zigzag will have a better damping behavior than that of the rectangular.

Figure 8:
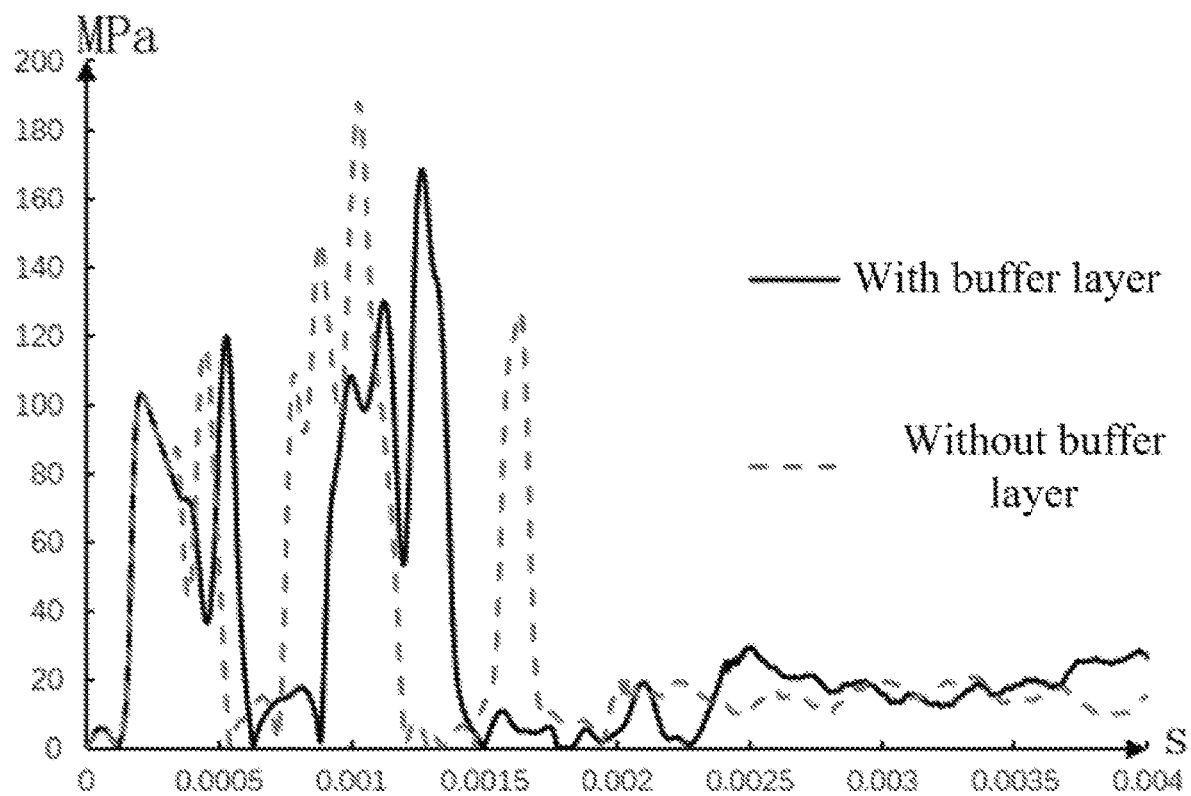
FIG. 8 is a graph of stress curves showing a comparison of a flexible OLED mobile phone module of the present disclosure and a flexible OLED mobile phone module of the prior art.

Referring to FIG. 8, X-axis is time and Y-axis is stress. In order to further verify that the buffer layer 40 of the present disclosure improves the impact resistance of the flexible OLED mobile phone module, an existing flexible OLED mobile without the buffer layer 40 and the flexible OLED mobile phone module with buffer layer 40 of the present disclosure are corresponding tested by a falling ball test. Stress curves of key devices (e.g., a thin film transistor (TFT) array substrate) in the flexible OLED panel 20 are obtained. As can be seen from FIG. 8, in comparison with the stress curve of the TFT array substrate in the flexible OLED mobile phone module without the buffer layer 40 with the stress curve of the TFT array substrate in the flexible OLED mobile phone module provided with the buffer layer 40, the TFT array substrate in the flexible OLED mobile phone module with the buffer layer 40 is disposed to be subjected to a stress significantly less than that of the TFT array substrate in the flexible OLED mobile phone module without the buffer layer 40.

In summary, the flexible OLED mobile phone module of the present disclosure includes: a mid-frame, a flexible OLED panel attached to the mid-frame, a back cover connected to the mid-frame, and a buffer layer disposed between the mid-frame and the back cover. The buffer layer is configured to absorb an impact force exerted on the flexible OLED panel. When the flexible OLED panel is impacted by a steel ball or the like, the impact force can be transmitted to the buffer layer through the mid-frame, and the buffer layer can absorb most of energy, so that no sharp impact occurs between the mid-frame and the back cover, thereby protecting the flexible OLED panel and improving impact resistance of the flexible OLED mobile phone module.

Based on the description given above, those having ordinary skills in the art may easily contemplate various changes and modifications of the technical solution and technical ideas of the present disclosure and all these changes and modifications are considered within a protection scope defined by the claims of the present disclosure.

What is claimed is:

1. A flexible organic light-emitting diode (OLED) mobile phone module, comprising: a mid-frame, a flexible OLED panel attached to the mid-frame, a back cover connected to the mid-frame, and a buffer layer disposed between the mid-frame and the back cover, wherein the buffer layer is configured to absorb an impact force exerted on the flexible OLED panel;

wherein the flexible OLED panel comprises a bending area, a first non-bending area adjacent to one side of the bending area, and a second non-bending area adjacent to another side of the bending area;

the mid-frame comprises a first mid-frame portion corresponding to the first non-bending area and a second mid-frame portion corresponding to the second non-bending area; and the first non-bending area is attached to the first mid-frame portion, and the second non-bending area is attached to the second mid-frame portion; and the back cover comprises a first back cover portion corresponding to the first non-bending area, a second back cover portion corresponding to the second non-bending area, a hinge corresponding to the bending area, a first sliding spring slidably connected to the first back cover portion, and a second sliding spring slidably connected to the second back cover portion, wherein the first sliding spring and the second sliding spring are fixedly connected by the hinge.

2. The flexible OLED mobile phone module as claimed in claim 1, wherein the first back cover portion is provided with a first protuberance corresponding to the first sliding spring, and the first sliding spring is provided with a first recess corresponding to the first protuberance;

the second back cover portion is provided with a second protuberance corresponding to the second sliding spring, and the second sliding spring is provided with a second recess corresponding to the second protuberance;

the first back cover portion and the first sliding spring are slidably connected by the first protuberance and the first recess; and the second back cover portion and second sliding spring are slidably connected by the second protuberance and the second recess.

3. The flexible OLED mobile phone module as claimed in claim 1, wherein the first back cover portion is connected to the first mid-frame portion by a screw, and the second back cover portion is connected to the second mid-frame portion by another screw.

4. The flexible OLED mobile phone module as claimed in claim 1, wherein the buffer layer comprises a rubber gasket.

5. The flexible OLED mobile phone module as claimed in claim 1, wherein the buffer layer comprises a first buffer portion disposed between the first back cover portion and the first mid-frame portion, and a second buffer portion disposed between the second back cover portion and the second mid-frame portion;

a shape of the first buffer portion comprises a "-" shape, and a shape of the second buffer portion comprises a "U" shape.

6. The flexible OLED mobile phone module as claimed in claim 5, wherein the first mid-frame portion is provided with a third recess configured to accommodate the first buffer portion, and the second mid-frame portion is provided with a fourth recess configured to accommodate the second buffer portion.

7. The flexible OLED mobile phone module as claimed in claim 6, wherein a depth of the third recess is less than a thickness of the first buffer portion, and a depth of the fourth recess is less than a thickness of the second buffer portion.

8. The flexible OLED mobile phone module as claimed in claim 1, wherein a cross-sectional shape of the buffer layer comprises a rectangular shape or a zigzag.

* * * * *